United States Patent [19]

Lusen et al.

[11] Patent Number: 5,289,658
[45] Date of Patent: Mar. 1, 1994

[54] METHOD AND APPARATUS FOR PROVIDING A GASKET SEAL BETWEEN SURFACES

[75] Inventors: Leonard Lusen, Lansdale; John B. Huls, Glenmoore, both of Pa.

[73] Assignee: The Bentley-Harris Manufacturing Company, Lionville, Pa.

[21] Appl. No.: 995,924

[22] Filed: Dec. 21, 1992

Related U.S. Application Data

[63] Continuation of Ser. No. 703,281, May 20, 1991, abandoned, which is a continuation-in-part of Ser. No. 589,792, Sep. 28, 1990, abandoned.

[51] Int. Cl.⁵ .............................................. E06B 7/16
[52] U.S. Cl. ................................ 49/492.1; 49/498.1; 277/166
[58] Field of Search ................ 49/475.1, 492.1, 493.1, 49/498.1, 479.1; 277/230, 166, 186, 189

[56] References Cited

U.S. PATENT DOCUMENTS

| | | | |
|---|---|---|---|
| 1,688,458 | 10/1928 | Eveleth | 49/493.1 |
| 2,060,353 | 11/1936 | Tea . | |
| 2,102,392 | 12/1937 | Tea . | |
| 2,121,854 | 6/1938 | Breer . | |
| 2,121,893 | 6/1938 | Tea . | |
| 2,139,329 | 12/1938 | Fessler | 49/492.1 |
| 2,169,503 | 8/1939 | Schlegel | 49/492.1 X |
| 2,176,964 | 10/1939 | Harrah | 296/44 |
| 2,523,839 | 9/1950 | McKinney | 49/492.1 X |
| 2,546,049 | 3/1951 | Weaver et al. | 49/494 |
| 2,579,072 | 5/1950 | Harris . | |
| 2,601,512 | 6/1952 | Gagnier | 49/492 |
| 2,607,965 | 8/1952 | Gagnier | 49/492 |
| 2,612,665 | 10/1952 | Scott | 49/492 |
| 2,638,642 | 5/1953 | Spraragen | 49/492.1 |
| 2,643,433 | 6/1953 | Scott . | |
| 2,867,464 | 1/1959 | Crampton . | |
| 2,938,249 | 5/1960 | Milne . | |
| 2,988,788 | 6/1961 | Saponara . | |
| 3,059,299 | 10/1962 | Sarafinas . | |
| 3,167,824 | 2/1965 | Berwanger . | |
| 3,167,826 | 2/1965 | Watzl et al. . | |
| 4,538,381 | 9/1985 | Vogel . | |
| 4,783,087 | 11/1988 | DeCore et al. . | |
| 4,822,060 | 4/1989 | Moyer et al. . | |
| 4,986,033 | 1/1991 | Weil | 277/166 X |
| 5,107,623 | 4/1992 | Weil | 277/166 X |

FOREIGN PATENT DOCUMENTS 2491120 9/1980 France .

Primary Examiner—Peter M. Cuomo
Assistant Examiner—Jerry Redman
Attorney, Agent, or Firm—Synnestvedt & Lechner

[57] ABSTRACT

Methods and apparatus for providing a seal between two surfaces. Gaskets in accordance with the invention provide efficient and economical devices to seal spaces between two surfaces. The gaskets comprise frames for providing a rigid substrate to the gasket which are formed into a shape substantially conforming to a shape of one of the surfaces, clips interfaced to the frame for securing the gasket between the two surfaces, the clips being interfaced to the frame in a corresponding relationship to a receiving aperture in one of the surfaces adapted to fixedly hold the clips, thereby securing the gasket between the two surfaces, and resilient members fitted over the frame such that the frame resides in an interior space of the resilient member and the clips extend outwardly through the resilient member to be engaged with the receiving aperture for filling the space between the two surfaces and for ensuring that the gasket adequately seals the space between the two surfaces.

9 Claims, 4 Drawing Sheets

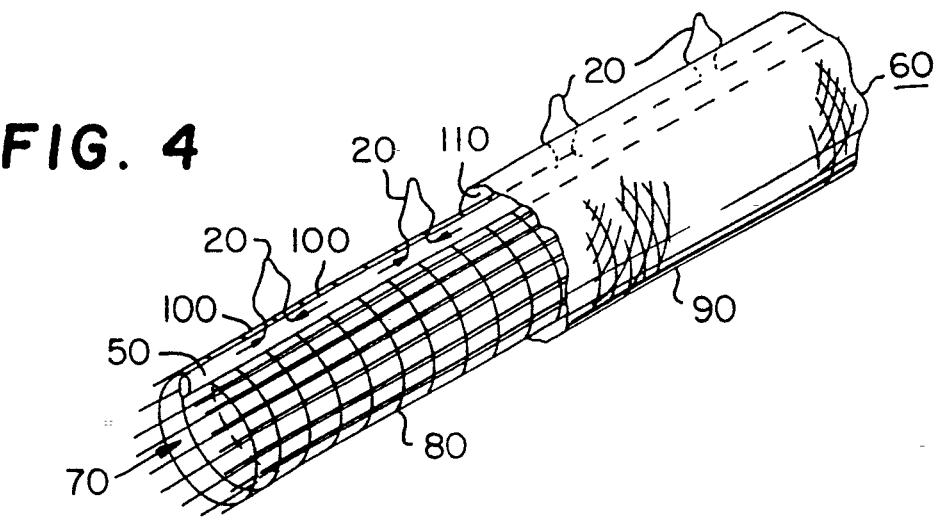
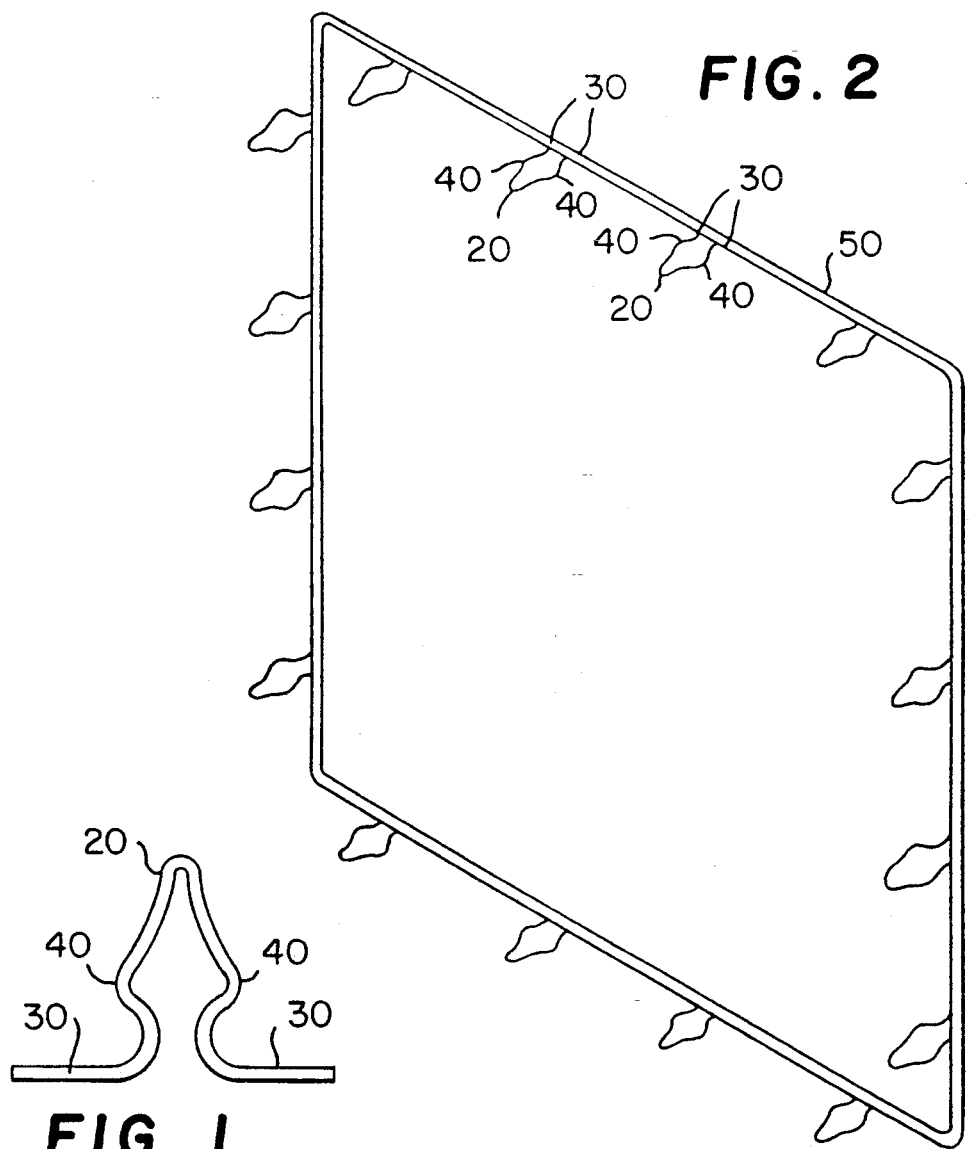

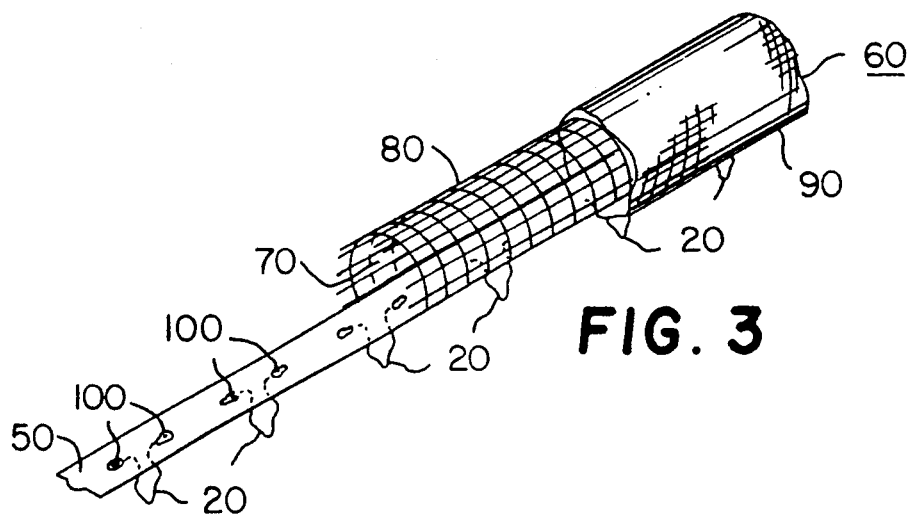
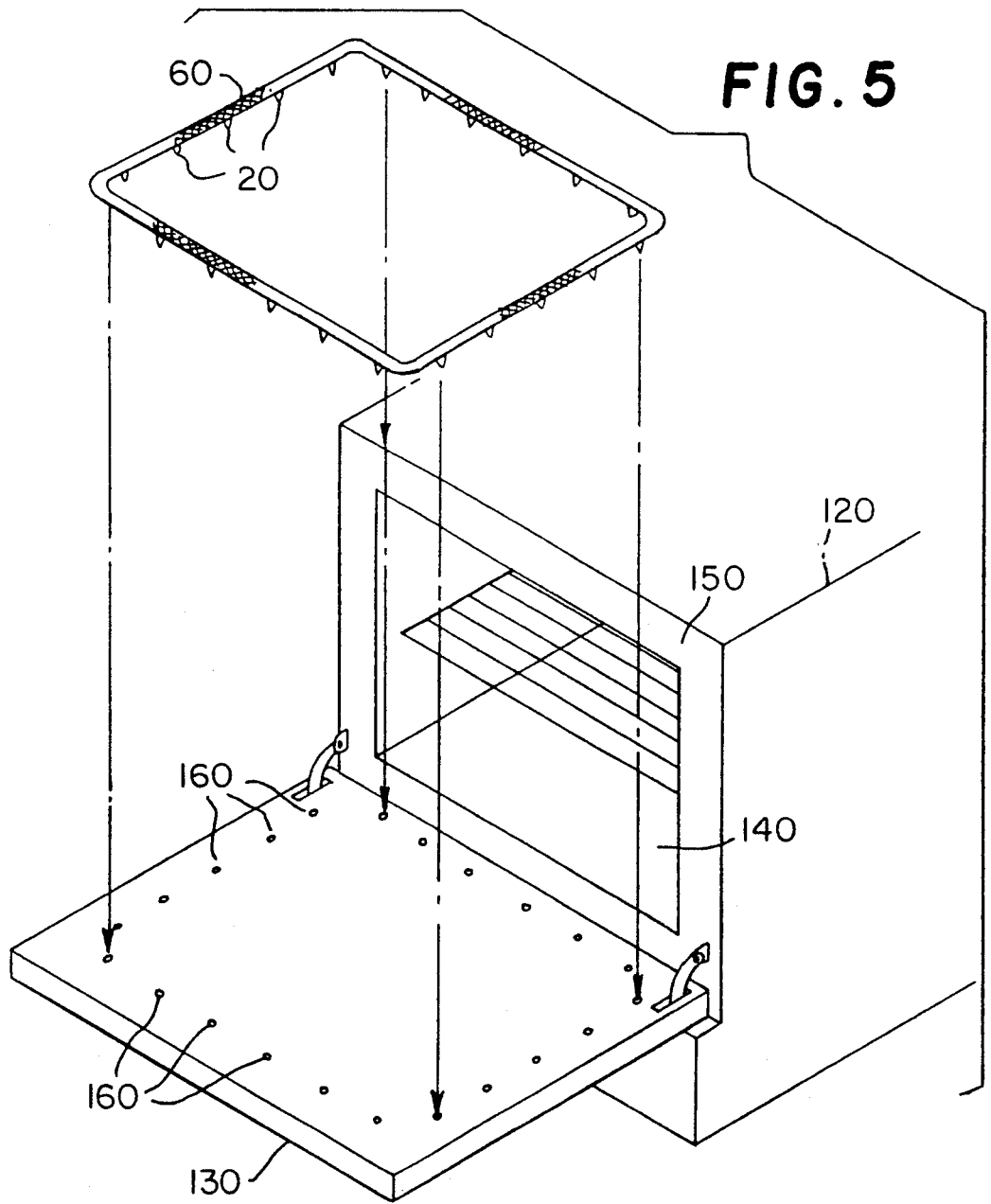

FIG. 6A
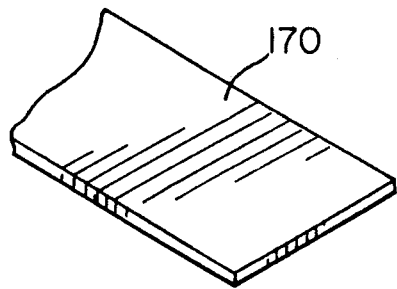
FIG. 6B
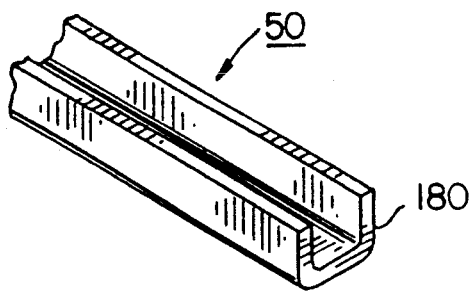
FIG. 6D
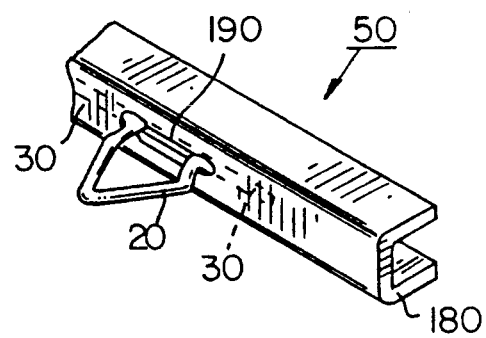
FIG. 6C
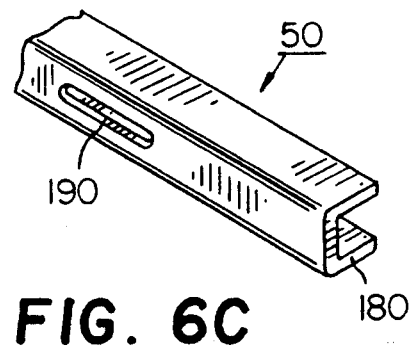
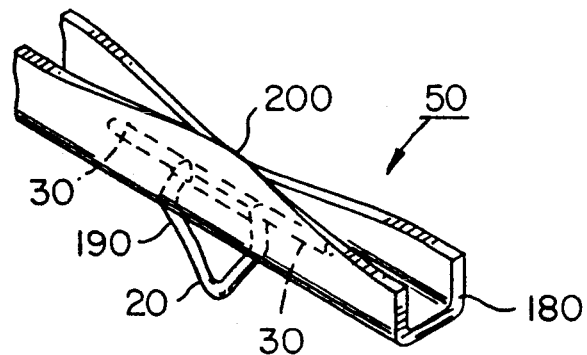
FIG. 6E

METHOD AND APPARATUS FOR PROVIDING A GASKET SEAL BETWEEN SURFACES

RELATED APPLICATIONS

This is a continuation of application Ser. No. 07/703,281, filed May 20, 1991 which is a continuation-in-part of application Ser. No. 589,792 on Sep. 28, 1990 now abandoned.

FIELD OF THE INVENTION

This invention relates generally to gaskets and the attachments thereof to surfaces and substrates. More particularly, this invention relates to woven tubular gaskets having support members to provide rigid substrates to the gaskets.

BACKGROUND OF THE INVENTION

Articles and devices for providing a sealing arrangement between two surfaces are well known. Depending upon the particular type of seal which must be achieved and the environment in which the seal will operate, particular types of gaskets and seals have been developed to accomplish adequate sealing and to ensure that the outside environment does not impinge in the area which the seal is intended to protect. To accomplish these goals, prior seals and gaskets have generally been made up of a sealing strip and an attachment mechanism that is applied to the strip to ensure that the gasket or seal will adhere to a pair of surfaces and perform the sealing function.

Weather stripping is typical of the above-mentioned gasket arrangement for sealing a pair of surfaces. For example, weather stripping which is especially adapted for use on motor vehicles to seal the openings around doors and windows usually consists of tubular covers made of a soft material such as rubber, and a series of zigzag loops which are adapted to secure the rubber to the door or window of the car. See, e.g., U.S. Pat. Nos. 2,060,353, Tea; 2,102,292, Tea; 2,121,854, Breer; and 2,121,893, Tea. The aforementioned patents generally teach a number of zigzag loops which encircle a core that is inserted through the tubular rubber covering and a fabric or panel member that covers the tubular covering to provide a unitary structure. The zigzag loops are not secured to the core, but merely slip onto the core after the zigzag loops are bent into a particular arrangement for insertion into the tubular member.

Weather stripping as taught in the above patents is typically only useful for protecting the interior of a car from inclement weather conditions. Such gaskets do not provide adequate sealing in high pressure or high temperature environments and suffer the infirmity of advanced degradation of the soft tubular material which provides the seal, and therefore of inadequate sealing once the seal ages in any significant manner. Therefore, the aforementioned weather strips do not satisfy long-felt needs in the art for adequate gasket and sealing arrangements which economically and efficiently attach to a surface defining an interior structure which must be protected from an outside environment.

As can be seen from the above-referenced weather strips, it is necessary to provide an attachment mechanism to the weather strip so that it can permanently seal the surfaces. To this end, prior clips and fastening devices for use in securing rubber weather seals and gaskets to doors have been utilized. In general, these fastening devices are embedded in a material such as plastic and consist of head and leg portions which may be formed from a single piece of wire. See, e.g., U.S. Pat. No. 2,643,433, Scott, at col. 3, lines 38–43. The head portion is engaged with a metal piece in the surface while the wire shank or legs are inserted through an opening in, for example, an automobile body. See Scott at col. 3, lines 55–61. Individual fasteners with wire shanks and legs may have various shapes and may connect rubber gaskets to oven doors through a flange. See, e.g., U.S. Pat. No. 2,988,788, Saponara, at col. 1, lines 12–17; U.S. Pat. No. 2,139,329, Fessler, at col. 1, lines 42–46.

Other various shapes and arrangements of clips or fasteners have been devised as attachment mechanisms for gaskets. Attaching clips may be looped out of wire to be engagable with a coil spring member in a weather strip and can comprise a base divided into two portions to provide a torsional action which holds a gasket in the door of a car in a firm matter. See, e.g., U.S. Pat. Nos. 3,167,824, Berwanger and 3,059,299, Sarafinas. Individual fasteners may also consist of simple bent wire clips, or more complex tabs that project upward and which are deformable for grabbing the periphery of a sealing member which will adhere to a surface. See U.S. Pat. No. 2,867,464, Crampton and U.S. Pat. No. 4,783,087, DeCore et al.

Thus, prior attachment mechanisms for sealing weather strips and gaskets to surfaces are usually provided in multiple fashion and attach individually to a gasket to be clipped to a surface which the gasket is intended to seal. However, this arrangement is extremely costly since a large number of individual fasteners must be provided to the gasket in order to effect adequate sealing of the surface. Individual clips are therefore not economical and fail to solve a long-felt need in the art for an economic and efficient device for providing attachment of a sealing gasket to a surface.

In efforts to ensure that sealing gaskets are adequately fastened to surfaces, prior clips have been integrally attached to springs and frames, or molded from a single piece of wire. See, e.g., U.S. Pat. No. 3,167,826, Watzl et al., col. 2, lines 27–31. This type of sealing gasket may be reinforced with a sinuous wire which is bent into a zigzag corrugated shape to provide snap fastener projections which are spaced lengthwise of the sealing strip and which conform to the shape of the door which the gasket will seal. See, e.g., U.S. Pat. No. 2,938,249, Milne, at col. 2, lines 28–34; U.S. Pat. No. 2,579,072, Harris, at col. 3, lines 25–29.

Similarly, prior sealing gaskets for use with oven doors may be bendable into a rectangular shape and have a wire that is simultaneously drawn through the base of the gasket while the gasket is being extruded. In such an arrangement, resilient metal clips are used to grip a base and extend to apertures to secure the gasket to the oven. See U.S. Pat. No. 4,538,381, Vogel, at col. 2, lines 23–44. However, none of the aforementioned gaskets which are adapted to seal the space between surfaces provide adequate rigidity and structure to the gasket to ensure a good seal or reduce the number of integrally formed clips to hold the gasket against one of the surfaces. Thus, the above-mentioned gaskets and seals are not economical and are difficult to implement.

Other arrangements for sealing ovens and oven doors are disclosed in French Patent 2,491,120, Marchand. The Marchand patent teaches a tubular braid having a metallic wire inserted therein. Connection mountings are inserted into the holes of an oven door and have curved members with a free end and a sharp border. The free end with the sharp border pierces a glass tubular fitting during the mounting process and engages the metallic wire at a curved portion of the mounting. In operation of the connections disclosed in the Marchand patent, the connections are first mounted to an oven door and then pierce the tubular fitting to make connection with the wire inserted therein to cause the tubular fitting to provide a watertight seal between a watertight surface and the oven door. However, the apparatus disclosed in the Marchand patent fails to reduce the number of required clips to seal the tubular member to the door and does not teach integrally mounting clips to a frame to provide rigidity to the gasket.

Woven tubular gaskets with continuous integral attachments are known to provide sealing of a space between two surfaces. See, e.g., U.S. Pat. No. 4,822,060, Moyer et al. The Moyer et al. patent teaches a woven tubular gasket having a continuous integral attachment which is contained within the woven tubular gasket and which has protrusions which extend through or are extendable through the walls of the woven tubular gasket to engage openings in a substrate. See Moyer et al., col. 2, lines 9–18. The protrusions are adapted to snap into the openings of a surface and the attachment also contains zigzag portions which line up substantially perpendicular to the plane of the protrusions to provide lateral stability for the woven tubular gaskets. See Moyer et al., col. 8, lines 33–53. Thus, the prior weather seals, gaskets, and sealing strips described above fail to fulfill long-felt needs in the art for rigid gaskets to seal the space between two surfaces. Gaskets provided in accordance with the present invention solve these long-felt needs as will be understood by those with skill in the art referenced to in the following detailed description read in conjunction with the accompanying drawings.

SUMMARY OF THE INVENTION

Methods and apparatus provided in accordance with the present invention solve the aforementioned long-felt needs and provide efficient and economical gaskets to seal spaces between two surfaces. With gaskets claimed and described herein, a reduced number of attachment clips may be used, thereby ensuring that gaskets provided in accordance with the present invention are simple and economical to produce. Such a result has not heretofore been achieved in the art and evinces a significant improvement over the prior weather strips, seals and gaskets which have been previously described.

In accordance with the present invention, a gasket for sealing a space between two surfaces is provided. The gasket preferably comprises frame means for providing a rigid substrate to the gasket and conforming the gasket to a shape substantially corresponding to a shape of one of the surfaces, clip means interfaced with the frame means for securing the gasket between the two surfaces, the clip means being mounted to the frame means in corresponding relationship to a receiving aperture in one of the surfaces adapted to fixedly hold the clip means, thereby securing the gasket between the two surfaces, and resilient means fitted over the frame means such that the frame means resides in an interior space of the resilient means and the clip means extends outwardly through the resilient means to be engaged with the receiving aperture for filling the space between the two spaces and ensuring that the gasket adequately seals the space between the two surfaces.

Methods of manufacturing gaskets provided in accordance with the present invention also significantly reduce the manufacturing process and solve long-felt needs in the art for efficient and economic methods of manufacturing gaskets to seal the space between two surfaces. In accordance with present invention, methods of manufacturing a gasket which is adapted to seal a space between surfaces comprise the steps of conforming a rigid frame to a shape substantially corresponding to a shape of one of the surfaces, interfacing at least one attachment clip to the frame in corresponding relationship to a receiving aperture in one of the surfaces adapted to fixedly hold the clip, and fitting a resilient member over the rigid frame so that the frame resides in an interior space of the resilient member and the clip extends outwardly of the resilient member to be engaged with the receiving aperture.

BRIEF DESCRIPTION OF THE DRAWINGS

FIG. 1 illustrates a clip which interfaces with an aperture in a surface and secures the gasket to the surface so the gasket can seal a space between two surfaces.

FIG. 2 is a frame having the clips of FIG. 1 integrally mounted thereto.

FIG. 3 is a cutaway perspective view of a gasket provided in accordance with the present invention having clips mounted to a frame which resides in the interior of the gasket.

FIG. 4 is a cutaway view of a preferred embodiment of a gasket provided in, accordance with the present invention having a wire frame with clips secured thereto.

FIG. 5 is a perspective view of a gasket provided in accordance with the present invention adapted to seal the space between an oven door and an oven.

FIGS. 6A–6E illustrate a preferred embodiment of attaching clips to a U-shaped frame, wherein FIGS. 6C and 6D are rotated 90° clockwise with respect to FIGS. 6B and 6E.

DETAILED DESCRIPTION OF PREFERRED EMBODIMENTS

Figure 7A:
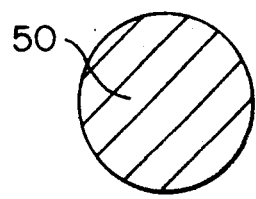
FIGS. 7A–7D are cross-sectional views of swaging clips to rigid wire frames in accordance with the present invention.

Referring now to the drawings wherein like reference numerals refer to like elements, FIG. 1 shows a clip 20 provided in accordance with the present invention which preferably interfaces to an aperture in a surface. In preferred embodiments, the clip comprises a pair of laterally extending mounting means 30 which interface or secure the clip to a frame and provide mountings for the clip so that it can efficiently secure to a surface. In further preferred embodiments, the clip 20 comprises a pair of shoulders 40 integrally connected with the mountings which retain the clip in the receiving aperture of the surface.

In still further preferred embodiments, clip 20 comprises a resilient material which can be deformed as it passes through the aperture such that the clip reforms to its natural shape after it has passed therethrough to maintain a fixed position in the aperture and secure the gasket to the surface. Preferably, clip 20 is constructed of a material which does not deform upon heating since gaskets provided in accordance with the present invention are particularly useful for sealing the space between an oven and an oven door which can achieve significantly high temperatures especially in a "self-cleaning" oven during the cleaning process.

In accordance with an important aspect of the present invention, the clips 20 are individually secured to frame means 50 as shown in FIG. 2. Frame means 50 provides a supporting frame for gaskets which seal spaces between surfaces as described herein. Prior gaskets are unsupported and as a result, require numerous closely spaced attaching clips to provide proper support so that the gasket can provide adequate sealing. With frame means 50 provided in accordance with the present invention, the gasket requires fewer clips, and the spacing of clips 20 along the frame means can be random or irregular.

In preferred embodiments, frame means 20 may be a flat strip wherein clips 20 are "spot-welded" to the frame 50 to provide a secure mounting of clips 20 to the frame. In still further preferred embodiments, frame means 50 may be a round wire having clips 20 spot-welded thereto. As an alternative to spot-welding clips 20 to frame 50, clips 20 may be cemented to the frame 50. The clips 20 may also be mounted to the frame by being punched out of the frame when the clip and the frame are made of the same material With high temperature gaskets provided in accordance with the present invention, sodium silicate cement could be used to secure the clips 20 to frame 50. Sodium silicate cement is a particularly useful cement to secure the clips to the frame, especially in gaskets that are intended to provide a seal between an oven and oven door, since sodium silicate cement degrades upon heating, thereby loosening the clips from the frame 50. When the gasket must be replaced after it has worn from years of use, the fact that the clips are detached from the frame advantageously allows easy replacement of the gasket since the clips can more easily be removed from the receiving apertures in the oven door when they are separated from frame 50. This provides a further advantageous result by significantly reducing the time for replacing the gasket once it has been worn. It will be recognized by those with skill in the art that other means for securing clips 20 to frame 50 such as swaging the clips in place or stapling the clips to the frame are available when different applications of gaskets provided in accordance with the present invention are required. All such means and equivalents thereof are intended to be within the scope of the present invention.

Since frame 50 provides a rigid supporting substrate for the gasket, it is possible to reduce the required number of clips 20 used to secure the gasket to one of the two surfaces to be sealed. Rigidity is required to maintain the sealing arrangement of the gasket to the surface when the surface is in use such as, for example, when it is desired to seal an oven door during the cleaning process in a self-cleaning oven. In prior gaskets which do not have a rigid frame, as many as 27 clips have been necessary to provide support to the gasket so that it will seal properly. In accordance with the present invention, as little as seven clips may be spot-welded or otherwise mounted in near optimum locations on frame 50 which may constitute irregular spacing of the clips and still provide adequate securing of the gasket to one of the surfaces so it seals the space between two surfaces. It has been determined that eleven clips provide optimal securing of the gasket to the surface.

Therefore, since so few clips may be utilized, gaskets provided in accordance with the present invention significantly reduce the labor costs associated with methods of producing these sealing gaskets. Furthermore, the spacing and locations of clips 20 are optimized in gaskets provided in accordance with the present invention, and the orientation of the clips can either be 360° around the vertical center line of the clip or along the gasket axis. Such results have not heretofore been achieved in the art and solve a long-felt need for efficient and economical gaskets to provide sealing between surfaces.

Referring now to FIG. 3, a woven tubular gasket provided in accordance with the present invention shown generally at 60 comprises a frame member disposed in the interior 70 of the woven tubular gasket 60. Woven tubular gaskets have been used as oven door gaskets and seals previously and generally comprise the combination of an inner tubular member 80 of knitted wire, and an outer tubular member 90 of braided fiberglass. Such structures have proven to be durable in high temperature use and provide good seals between ovens, oven doors, and other surfaces.

The inner knitted wire tubular member 80, sometimes referred to as a "knitted wire bulb," provides a long-time resilient support for the fiberglass tubular member 90 which provides the desired sealing of the space. Woven tubular gaskets and methods of making woven tubular gaskets are described and disclosed in the commonly assigned U.S. Pat. No. 4,822,060, Moyer et al., "Woven Tubular Gaskets With Continuous Integral Attachment Means," particularly at col. 1, lines 17-34 and col. 2, line 7 through col. 10, line 57, the teachings of which are specifically incorporated herein by reference. Woven tubular gaskets are generally useful for providing seals in high temperature and other harsh environments.

Referring to FIG. 4, the mountings 30 are placed through a hole or slot, shown generally at 100, before the clips are secured to the frame 50. In still further preferred embodiments, clips 20 are then spot-welded to frame 50 which is preferably a flat strip. The flat strip is placed in the interior of the knitted wire bulb. In further preferred embodiments, the woven tubular gasket 60 is a coaxial gasket wherein knitted wire bulb 80 and braided fiberglass tubular member 90 share a substantially common axis, and braided fiberglass tubular member 90 has a larger radius than the radius of the knitted wire bulb 80. This arrangement preferably provides the correct orientation of the knitted wire bulb within fiberglass tubular member 90 to provide a combination sealing gasket wherein the flat strip or round wire frame 50 resides in the interior of the knitted wire bulb.

In still further preferred embodiments, the clips 20 extend through the knitted wire bulb 80 and the braided fiberglass tubular member 90 to be interfaced in one-to-one correspondence with receiving apertures in one of the surfaces to be sealed, for example, an oven door. In further preferred embodiments, clips 20 extend through the first tubular member 80 and second tubular member 90 without damaging the knitted wires of the knitted wire bulb or the braided fiberglass strands of the braided tubular member 90. This ensures that adequate sealing is maintained with woven tubular gaskets provided in accordance with the present invention.

In other preferred embodiments, the frame means 50 is a round wire having clips 20 spot-welded, cemented, or otherwise mounted thereto as shown in FIG. 4. In alternative embodiments, the frame 50 is disposed between the inner knitted wire bulb 80 and outer braided fiberglass tubular member 90 in space 110. In this manner, clips 20 are adapted to extend or protrude through the fiberglass tubular member 90 of gasket 60 without damaging the braided fiberglass strands of the outer tubular member 90. The frame means may be secured between the coaxial tubular members 80 and 90 of gasket 60, or in the interior 70 of the knitted wire bulb 60. This arrangement also provides rigidity to the gasket, thereby reducing the number of required clips 20 to secure the gasket 60 to a surface having receiving apertures for clips 20.

Referring now to FIG. 5, an oven 120 comprises a door 130 and an opening 140 that is defined by a surface 150 of the oven. In a preferred embodiment, door 130 has a series of receiving apertures 160 integrally formed thereon and adapted to receive the clips 20 which protrude through the woven tubular gasket 60. Since woven tubular gasket 60 preferably comprises a rigid frame 50 as described herein, a reduced number of clips is required to secure gasket 60 and clips 20 in apertures 160 and to the oven door 130 which forms a first surface. The oven itself forms a second surface 150 defining the opening 140 and the space which gasket 60 is intended to seal.

In conventional ovens which utilize woven tubular gaskets to provide a seal between the oven and oven door, the receiving apertures or holes 160 are numerous so that enough clips can be utilized to ensure that the woven tubular gasket 60 is fixedly secured to the door to provide an efficient seal. However in the usual course of finishing ovens, a baked enamel surface covers the apertures 160 which must then be cleaned of the baked enamel before it fully sets in order to reopen the apertures so that the gasket 60 can be secured thereto by clips 20. This presents a significant labor-intensive problem since with an increased number of apertures, more work must be done after enameling to reopen the holes.

With woven tubular gaskets provided in accordance with the present invention, this labor-intensive problem is significantly reduced since substantially fewer receiving apertures or holes 160 are introduced to the door, thereby reducing the amount of reopening necessary after enamelling and finishing the oven. Thus, woven tubular gaskets having rigid frames inserted therein provided in accordance with the present invention achieve significant advantageous results not heretofore achieved with prior gaskets for sealing the space between two surfaces. Such tubular gaskets solve the long-felt need in the art for efficient and economical gaskets that provide high quality seals in high temperature and other environments.

Other configurations of rigid frames in accordance with the invention are also possible and provide alternative ways of interfacing the clips to the frame. In a further preferred embodiment, the frame 50 can be fashioned from a flat strip 170 as illustrated in FIG. 6A. As shown in FIG. 6B, flat strip 170 is rolled into a "U-channel" 180 by conventional rolling techniques. In FIG. 6C, a slot 190 is preferably punched into the U-channel 180 at the desired clip location. Clip 20 is inserted into slot 190 such that the laterally extending mountings 30 reside within the inside of U-channel 180 as shown in FIG. 6D.

As illustrated in FIG. 6E, the U-channel walls are then preferably rolled over to trap the mountings 30 so that clip 20 is secured to the frame 50. In this manner, the clip remains "free floating" in frame 50, that is, it can partially move within the U-channel, but still provides the benefit of easy insertion into apertures in the oven to secure the gasket thereto.

Figure 7B:
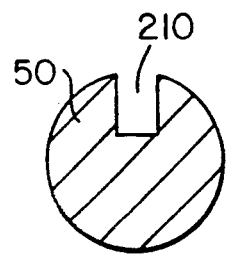

Referring now to FIGS. 7A-7D and mentioned earlier as an alternative way of securing clips to rigid frames provided in accordance with the present invention, swaging clips 20 to rigid frame 50 is illustrated. As known by those with skill in the art, swaging is defined as the squeezing of a blank, here the rigid wire frame 50, to an appreciably different shape into a relatively small area with freedom to flow without restraint. In FIG. 7A the frame 50 in a preferred embodiment is shown in cross-section as a rigid wire. In FIG. 7B, slot 210 is formed in rigid wire frame 50 either locally corresponding to desired places for clips 20, or continuously throughout the whole frame.

Figure 7C:
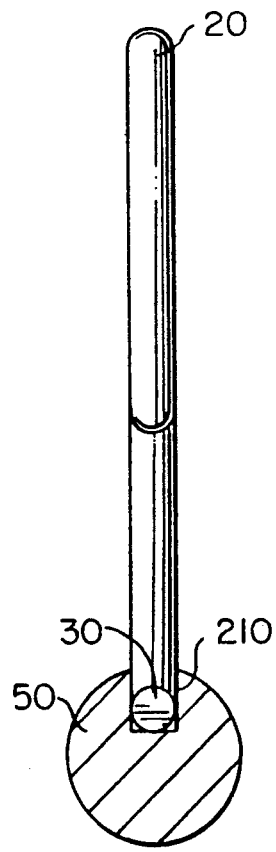
Figure 7D:
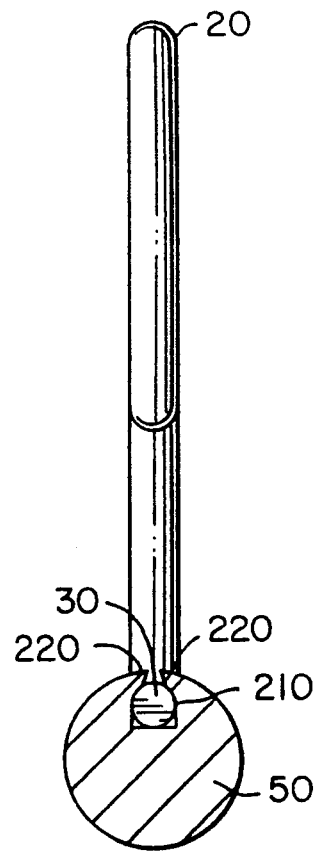

In FIG. 7C, mountings 30 are squeezed into slot 210. This begins the swaging process, and in FIG. 7D, the top of slot 210 is swaged over the laterally extending mountings 30 at spots 220 to provide a typical "cold forged" or swaged connection between clips 20 and rigid wire frame 50. Various die equipment can be used to perform swaging in accordance with the present invention, and swaging provides a useful alternative embodiment of securing clips 20 to rigid wire frame 50 as shown herein.

There have thus been described certain preferred embodiments of gaskets to seal the space between two surfaces. While preferred embodiments have been described and disclosed, it will be recognized by those with skill in the art that modifications are within the true spirit and scope of the invention. The appended claims are intended to encompass all such modifications.

What is claimed is:

1. A gasket for sealing a space between two surfaces in an oven comprising:
    frame means comprising a substantially U-shaped channel for providing a rigid substrate to the gasket and conforming the gasket to a shape substantially corresponding to a shape of one of the surfaces;
    a plurality of individual clip members for securing the gasket between the two surfaces;
    said channel having slots formed therein corresponding to desired locations of the clip members, said clip members being interfitted within the slots and the channel having side wall portions adjacent the slots, said side wall portions being pinched together int he region of the clip member to fixedly secure the clip members with respect to the channel;
    a plurality of receiving apertures in one of the surfaces, the clip members being interfaced to the channel in corresponding relationship to the apertures to fixedly hold the clip members, thereby securing the gasket between the two surfaces; and
    resilient means fitted over the frame means such that the frame means reside in an interior space of the resilient means and the clip members extend outwardly through the resilient means to be engaged with the receiving apertures for filling the space between the two surfaces in the oven and ensuring that the gasket adequately seals the space between the two surfaces.

2. The gasket recited in claim 1 wherein the resilient means comprises a knitted wire bulb.

3. The gasket recited in claim 2 further comprising a braided fiberglass tubular member fitted over the knitted wire bulb and having the clip members extending therethrough for sealing the space.

4. A heat resistant gasket for sealing the space between an oven and oven door wherein the oven door has a series of apertures arranged in a pattern adapted to facilitate sealing comprising:
- a rigid frame member comprising a substantially U-shaped channel for providing structural integrity for the heat resistant gasket;
- a plurality of individual clip members adapted to interface in one-to-one correspondence with the series of apertures in the oven door, said channel having a plurality of slots formed therein corresponding to desired locations of the clip members on the heat resistant gasket, the individual clip members being further secured within said slots;
- a first tubular member for providing a resilient base to the gasket; and
- a second tubular member being substantially coaxial with the first tubular member and having a larger radius than the first tubular member for providing the seal between the oven and oven door, the rigid frame member being housed within the interior of one of the first and second tubular members such that the individual clip members extend through the second tubular member for engagement with the apertures.

5. The heat resistant gasket recited in claim 4 wherein the first tubular member comprises a knitted wire bulb.

6. The heat resistant gasket recited in claim 5 wherein the second tubular member comprises braided fiberglass.

7. The heat resistant gasket recited in claim 6 wherein the frame member resides in a coaxial space between the knitted wire bulb and the second tubular member.

8. The heat resistant gasket recited in claim 6 wherein the frame member resides in a coaxial space within the knitted wire bulb and the plurality of clip members extend through the knitted wire bulb.

9. The heat resistant gasket recited in claim 8 wherein there are seven clip members spot-welded to the flat strip at substantially optimal locations.

* * * * *